J. G. SMITH.
Stove.
No. 218,788. Patented Aug. 19, 1879.
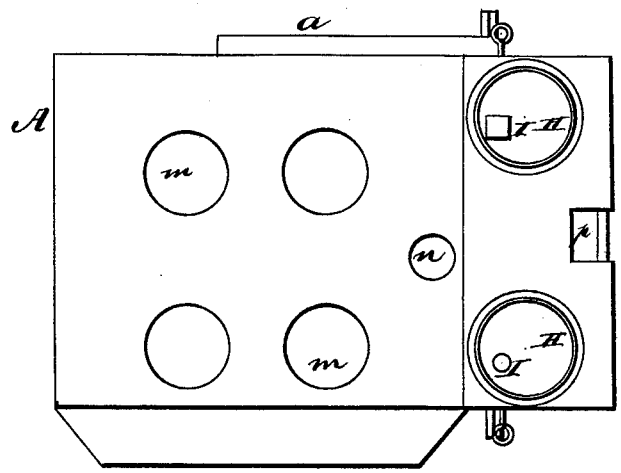
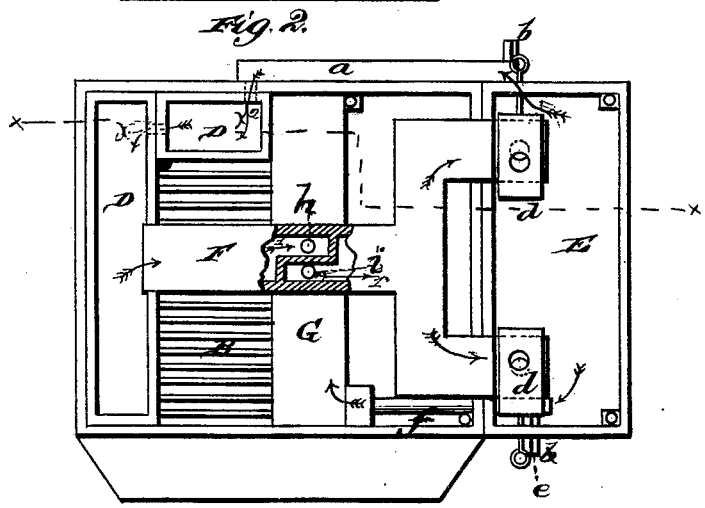
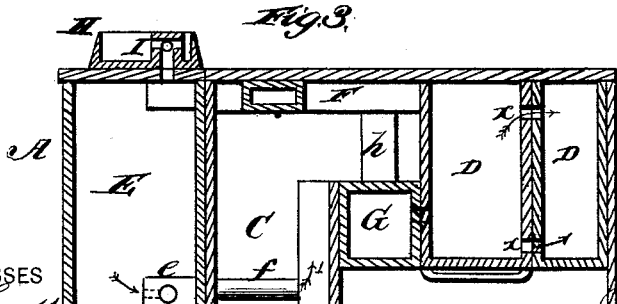

UNITED STATES PATENT OFFICE.

JAMES G. SMITH, OF CHAGRIN FALLS, OHIO.

IMPROVEMENT IN STOVES.

Specification forming part of Letters Patent No. 218,788, dated August 19, 1879; application filed July 3, 1879.

*To all whom it may concern:*

Be it known that I, JAMES G. SMITH, of Chagrin Falls, in the county of Cuyahoga and State of Ohio, have invented a new and valuable Improvement in Stoves; and I do hereby declare that the following is a full, clear, and exact description of the construction and operation of the same, reference being had to the annexed drawings, making a part of this specification, and to the letters and figures of reference marked thereon.

Figure 1 is a plan view of the stove. Fig. 2 is a plan view, partly in section, with the top plates removed; and Fig. 3 is a vertical sectional view of the stove, taken through line $x\,x$ in Fig. 2.

The nature of my invention relates to certain improvements upon the stove for which Letters Patent were granted to me November 5, 1878, as will be hereinafter more fully set forth.

The annexed drawings, to which reference is made, fully illustrate my invention.

A represents the shell or body of the stove, with fire-box B and oven C. D D are the steam-generating reservoirs surrounding the fire-box either on the inside or outside, as desired. E is a receiving, self-feeding, and furnishing reservoir, placed at one side of the stove instead of at the top. This latter reservoir is connected with and feeds the steam-generating reservoirs D by means of a suitable connecting-tube, $a$, provided with a stop-cock, $b$, for closing communication between them when desired. This arrangement greatly simplifies and obviates the objections and complications of the original self-feeding and receiving reservoir.

The steam generated in the reservoirs D is passed through heated pipes F, placed over the fire or top of the stove, the steam thus becoming superheated before being used for cooking or heating purposes, and it is conducted by said pipe F to the receiving-reservoir E, to be condensed or passed under cooking utensils, if desired, by means of sliding plates or dampers $d$, having openings corresponding with the openings in the steam-heating pipes, and which may be alternately closed or opened, at will.

G represents a separate independent internal steam-generating chamber, located between the fire-box and oven, and connected with and fed by the side or receiving reservoir, E, by means of a separate tube, $f$, having also a stop-cock, $e$, by which communication may be opened and closed at will.

The object of this independent steam-generating and steam-heating reservoir or chamber is to generate steam for cooking and heating purposes, more especially for winter use, when the summer steam-generating reservoirs D are removed for the purpose of allowing the stove to give out more heat into the room. Also, for summer use, when the summer reservoirs D are used for generating steam, the chamber G may be used as a steam-heating chamber by closing the stop-cock $e$ in the connecting-tube $f$, and passing the steam generated in the summer reservoirs D into the steam-chamber G by means of a tube, $h$, extending from the pipe F down to the chamber G, which, thus becoming doubly heated, and returning into the pipe F through another tube, $i$, is conducted to the reservoir E and used, as above described.

When used as a winter steam-generating reservoir, the steam passes up through the tube $i$ into the pipe F, and is used in the same way.

By this arrangement it is readily converted from a summer to a winter stove by simply removing the summer reservoirs D, while by using the winter reservoir G all the advantages of the cooking arrangement by steam are retained.

When used without the summer reservoirs D, the opening into the end of the pipe F should be closed.

On the top of the cover, over the receiving-reservoir E, are elevated circular rims H, communicating with the steam-pipes F, for diffusing the steam more generally under cooking or heating utensils placed over them. Within each rim H is a tube, I, communicating with the pipe F, said tube being closed at the top, and provided with side openings for the passage of steam under the cooking utensils, which prevents the condensed steam flowing back into the reservoir E and impregnating the water with the flavor of the food while cooking.

The steam-heating pipe F may be tapped at any point desired for conducting the steam through pipes to any apartment for heating purposes.

$m$ $m$ are griddle-openings. $n$ is the pipe-opening. $x$ $x$ are openings near the top and bottom of the reservoirs D, communicating with and connecting the two together, for the passage of water below and steam above. $p$ is an opening in the cover for the reservoir E, for the admission of water.

One of the reservoirs D may be provided with a faucet for drawing off hot water. Communication between the reservoirs D D is established by means of perforations or holes $x$, one near the tops and the other near the bottoms of said reservoirs, and an opening, $x^2$, provides communication between the tube $a$ and the smaller reservoir D.

I claim—

1. The combination of the removable steam-generating reservoirs D, the side receiving and self-feeding reservoir, E, and connecting-tube $a$, with stop-cocks $b$, substantially as herein set forth.

2. The steam-heating pipe F, arranged over the fire or stove, in combination with the reservoirs D and E, and connected to the chamber G by the tubes $h$ and $i$, as and for the purposes herein set forth.

3. The independent steam-generating chamber G, connected with reservoir E by the tube $f$, and to the steam-pipe F by the pipe $i$, substantially as and for the purposes herein set forth.

4. The elevated rim H, with tube I, in combination with the steam-pipe F, as and for the purposes set forth.

In testimony that I claim the above I have hereunto subscribed my name in the presence of two witnesses.

JAMES GREGORY SMITH.

Witnesses:
ALEXANDER A. GILES,
PHILEAN GILES.